United States Patent [19]
Sakurai et al.

[11] Patent Number: 5,857,236
[45] Date of Patent: *Jan. 12, 1999

[54] WIPER APPARATUS WITH PRESSURE DISPERSING MEANS

[75] Inventors: Hideaki Sakurai; Toshimi Sugiyama; Yasuo Ohnishi; Kenzi Takahashi; Kiyouzi Yamamoto; Keikichi Furukawa, all of Toyota, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 624,217

[22] Filed: Mar. 29, 1996

[30] Foreign Application Priority Data

May 11, 1995 [JP] Japan ...................... 7-113442

[51] Int. Cl.⁶ .................. B60S 1/28; B60S 1/38
[52] U.S. Cl. ................. 15/250.202; 15/250.37; 15/250.4; 15/250.41
[58] Field of Search .............. 15/250.37, 250.4, 15/250.41, 250.19, 250.48, 250.202, 250.201

[56] References Cited

U.S. PATENT DOCUMENTS

| | | | |
|---|---|---|---|
| 2,733,469 | 2/1956 | Oishei | 15/250.4 |
| 2,775,780 | 1/1957 | Pisano | 15/250.41 |
| 2,824,331 | 2/1958 | Wallis | 15/250.37 |
| 2,834,976 | 5/1958 | Oishei | 15/250.4 |
| 2,876,478 | 3/1959 | Wallis | 15/250.37 |
| 4,553,292 | 11/1985 | Speth | 15/250.41 |
| 5,056,182 | 10/1991 | Fukumoto et al. | 15/250.202 |
| 5,235,720 | 8/1993 | Kinder | 15/250.4 |
| 5,390,391 | 2/1995 | Zimmer | 15/250.202 |
| 5,392,488 | 2/1995 | Li | 15/250.41 |
| 5,465,454 | 11/1995 | Chang | 15/250.41 |

FOREIGN PATENT DOCUMENTS

| | | | |
|---|---|---|---|
| 2490565 | 3/1982 | France | 15/250.41 |
| 40 32 762 | 8/1991 | Germany . | |
| 56-070455 | 10/1954 | Japan . | |
| 62-146665 | 9/1987 | Japan . | |
| 62-152865 | 9/1987 | Japan . | |
| 62-52865 | 9/1987 | Japan . | |
| 62-156070 | 10/1987 | Japan . | |
| 2-117953 | 9/1990 | Japan . | |
| 4-026156 | 3/1992 | Japan . | |
| 4-118338 | 4/1992 | Japan . | |
| 5-012326 | 2/1993 | Japan . | |
| 5-238356 | 9/1993 | Japan . | |
| 2242120 | 9/1991 | United Kingdom | 15/250.37 |

*Primary Examiner*—Gary K. Graham
*Attorney, Agent, or Firm*—Pillsbury Madison & Sutro LLP

[57] ABSTRACT

The present invention provides a wiper apparatus comprising a blade rubber for wiping windshield glass, a wiper blade on which the blade rubber is mounted, a wiper arm which is pivotally supported on a vehicle body and on which the wiper blade is mounted, and a dispersing device. The wiper arm is provided such that a pressing force is applied to the wiper arm so as to cause the blade rubber to contact the windshield glass with a predetermined press contact force. The dispersing device disperses toward the windshield glass the press contact force applied to the blade rubber due to the pressing force of the wiper arm, by the dispersing device and the blade rubber together press contacting the windshield glass at at least one of two reversing positions at which swinging of the wiper arm reverses, so as to reduce the press contact force of the blade rubber against the windshield glass.

8 Claims, 14 Drawing Sheets

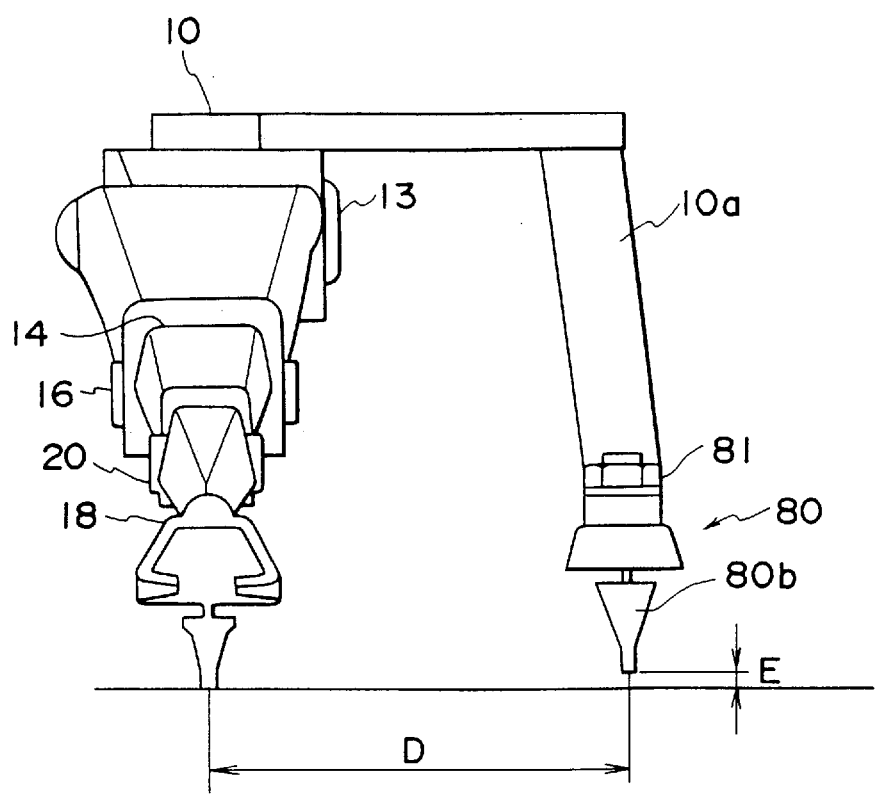

WIPER APPARATUS WITH PRESSURE DISPERSING MEANS

BACKGROUND OF THE INVENTION

1. Field of the Invention

The present invention relates to a wiper apparatus for wiping raindrops or the like from a glass, and particularly to a wiper apparatus for wiping a windshield glass of a vehicle.

2. Description of the Related Art

In a conventional wiper apparatus, in order to prevent the wiping performance from deteriorating when the vehicle travels at high speeds due to a wiper blade being lifted off of the windshield glass, a pressing force is applied to the wiper blade via a wiper arm so as to increase the force of pressing a blade rubber against the windshield glass, thereby increasing the press contact force between the blade rubber and the windshield glass surface. However, this causes a drawback in that the press contact force becomes greater than the force which is required when the vehicle is traveling at normal speeds, and thus greater noise is generated at the positions where the swinging direction of the wiper is reversed.

A wiper apparatus having a means for reducing noise generated when the swing of the wiper is reversed is disclosed, for example, in Japanese Utility Model Application Laid-open No. 2-117953. In the disclosed wiper apparatus, the pressing force applied to a wiper arm is reduced via a cam at the positions where the swing of the wiper is reversed. The structure of this wiping apparatus will be described with reference to FIG. 14A and FIG. 14B, wherein FIG. 14A shows a cross-section of the wiper along the longitudinal direction thereof and FIG. 14B is a schematic view showing a cam portion and a vicinity thereof.

As shown in FIG. 14A, an arm head 101 which swings over a windshield glass so as to wipe the windshield glass surface is fixed by a nut 104 to a pivot 103, which is fitted to a pivot holder 102 and extends through and projects from the arm head 101. More specifically, the nut 104 is screwed to an end of the pivot 103 so as to fix the arm head 101. A wiper arm 105 is pivotally mounted to the arm head 101 by using a coupling pin 106, and an unillustrated arm piece is attached to the wiper arm 105 so as to support a wiper blade (not shown).

One end of a coil spring 107 for varying a blade pressing force by its elasticity is anchored to an arm piece (not shown) supporting the wiper blade. The other end of the coil spring 107 is engaged with one end of a hook 108. The other end of the hook 108 is engaged with a coupling pin 109.

A lever 112 is supported by the arm head 101 via a coupling pin 113. A roller 111 is disposed at one end of the lever 112 so as to move on end cam surfaces 110a and on an intermediate cam surface 110b, which will be described later, of a cam portion 110. The other end of the lever 112 is engaged with the coupling pin 109.

The portion of the lever 112 between the coupling pin 113 and the roller 111 is bent substantially in an S shape so that the lever 112 is substantially parallel to the arm head 101 while the roller 111 moves on the end cam surfaces 110a.

As shown in FIG. 14B, the cam portion 110 is a structure in which the end cam surfaces 110a and the intermediate cam surface 110b are formed continuously. The roller 111 moves on the end cam surfaces 110a when the wiper blade is at its swing reversing positions. The intermediate cam surface 110b is positioned higher than the end cam surfaces 110a.

The action of the above-described wiper apparatus will now be described. While the roller 111 is moving on the end cam surface 110a, i.e., when the wiper is in a vicinity of one of its swing reversing positions, the lever 112 is in the state represented by the solid line, where the tensile direction of the coil spring 107 coincides with the center axis of the coil spring 107. Since one end of the coil spring 107 is engaged with the arm piece supporting the wiper blade, the elastic force of the coil spring 107 acts so as to pull on the arm piece, thereby reducing the pressing force applied to the wiper arm in a vicinity of the swing reversing position of the wiper. This reduces the noise generated when the swing of the wiper is reversed.

Subsequently, when the lever 112, together with the arm head 101, pivots about the pivot 103, the roller 111 abuts the cam surface of the cam portion 110 and then moves from the end cam surface 110a to the intermediate cam surface 110b. That is, after the wiper reverses its swing, the roller 111 is pushed up. This causes the lever 112 to push the coupling pin 109 down so that the lever 112 assumes the state represented by the two dots-and-dash line, since the lever 112 is supported by the coupling pin 113. As a result, the tensile direction of the coil spring 107 falls to below the axis of the coil spring 107, whereby a component force of the elastic force of the coil spring 107 acts as a tensile force which pulls on the arm piece. Consequently, the reduction in the pressing force is smaller than that in the vicinity of the swing reversing position of the wiper. That is, the wiper wipes the windshield glass without a significant reduction in the pressing force when the wiper is located at positions other than the swing reversing position.

However, in the wiper apparatus described above, since the cam which reduces the pressing force applied to the wiper arm at the swing reversing position of the wiper is distant from the blade rubber which is pressed against the windshield glass and which is a source of noise generated when the swing of the wiper is reversed, a change in the pressing force is transmitted to the blade rubber by varying the tensile force of the coil spring through coupling pins. That is, a varying force is transmitted via component parts from the cam, which is a point of force for varying the pressing force, to the contact position between the blade rubber and the windshield glass, which is a point of application.

Hence, a loss of force occurs at each of the component parts transmitting the varying force, resulting in an inability to efficiently transmit a change in force to the point of application. This presents a drawback in that noise generated when the swing of the wiper is reversed is not sufficiently reduced.

SUMMARY OF THE INVENTION

An object of a wiper apparatus of the present invention is to disperse a force pressing a wiper blade onto the surface of windshield glass at the positions where the swinging direction of the wiper is reversed without changing a pressing force applied to the wiper arm, thereby reducing the press contact force of a blade rubber and thus reducing noise generated when the swing of the wiper is reversed.

According to a first aspect of the present invention, there is provided a wiper apparatus comprising a blade rubber for wiping windshield glass, a wiper blade on which said blade rubber is mounted, a wiper arm which is pivotally supported on a vehicle body and on which the wiper blade is mounted, and a dispersing device. The wiper arm is provided such that a pressing force is applied to the wiper arm so as to cause the blade rubber to contact the windshield glass with a predetermined press contact force. The dispersing device disperses toward the windshield glass the press contact force applied to the blade rubber due to the pressing force of the wiper arm, by the dispersing device and the blade rubber together press contacting the windshield glass at at least one of two reversing positions at which swinging of the wiper arm reverses, so as to reduce the press contact force of the blade rubber against the windshield glass.

According to a second aspect of the present invention, the dispersing device of the wiper apparatus according to the first aspect of the present invention is provided such that, in a case in which the blade rubber wipes a curved windshield glass, a plane which includes a contact point of the windshield glass and the dispersing device and a contact point of the blade rubber and the windshield glass substantially coincides with the surface of the windshield glass, so that the dispersing device and the blade rubber press contact the windshield glass at the reversing positions.

According to a third aspect of the present invention, there is provided the dispersing device of the wiper apparatus according to the second aspect of the present invention wherein, in a case in which the blade rubber wipes a windshield glass whose widthwise direction end portions are curved further toward a rear of a vehicle than a widthwise direction central portion of the windshield glass, the dispersing device is provided at each reversing position at a position which is separated by a predetermined distance from a surface of the windshield glass in accordance with a curvature of the windshield glass, so that the dispersing device and the blade rubber press contact the windshield glass at the reversing positions.

According to a fourth aspect of the present invention, there is provided the dispersing device of the wiper apparatus according to the third aspect of the present invention wherein the dispersing device is used when the blade rubber wipes a windshield glass which curves toward the rear of a vehicle at both side portions thereof with respect to the widthwise direction central portion thereof and which curves toward the roof of the vehicle at the upper portion of the widthwise direction central portion thereof, the dispersing device is provided at each reversing position at a position which is separated in accordance with the curvature of the windshield glass by a predetermined distance in a longitudinal direction of the wiper blade from a longitudinal direction central portion of the wiper blade, so that the dispersing device press contacts the windshield glass together with the blade rubber at the swing reversing position of the wiper arm.

According to the first aspect of the present invention, the dispersing device disperses toward the windshield glass the press contact force applied to the blade rubber due to the pressing force of the wiper arm, by the dispersing device and the blade rubber together press contacting the windshield glass at at least one of two reversing positions at which swinging of the wiper arm reverses.

According to the second aspect of the present invention, the dispersing device is provided such that a plane which includes a contact point of the windshield glass and the dispersing device and a contact point of the blade rubber and the windshield glass substantially coincides with the surface of the windshield glass, so that, in a case in which the blade rubber wipes a curved windshield glass, the dispersing device and the blade rubber press contact the windshield glass at the reversing positions.

According to the third aspect of the present invention, the dispersing device is provided at each reversing position at a position which is separated by a predetermined distance from a surface of the windshield glass in accordance with a curvature of the windshield glass, so that, in a case in which the blade rubber wipes a windshield glass whose widthwise direction end portions are curved further toward a rear of a vehicle than a widthwise direction central portion of the windshield glass, the dispersing device and the blade rubber press contact the windshield glass at the reversing positions.

According to the fourth aspect of the present invention the dispersing device is provided at each reversing position at a position which is separated in accordance with the curvature of the windshield glass by a predetermined distance in a longitudinal direction of the wiper blade from a longitudinal direction central portion of the wiper blade, so that when the blade rubber wipes a windshield glass which curves toward the rear of a vehicle at both side portions thereof with respect to the widthwise direction central portion thereof and which curves toward the roof of the vehicle at the upper portion of the widthwise direction central portion thereof, the dispersing device press contacts the windshield glass together with the blade rubber at the swing reversing position of the wiper arm.

According to the present invention, noise generated when the swing of the wiper is reversed is reduced by reducing a press contact force applied to the wiper blade rubber without varying a pressing force applied to the wiper arm. Further, since a press contact force applied to the blade rubber is reduced by dispersing it on the windshield glass without intervention of other parts, a loss of force does not occur when the press contact force is reduced, thereby efficiently reducing noise generated when the swing of the wiper is reversed. This enables a sufficient reduction of noise generated when the swing of the wiper is reversed.

BRIEF DESCRIPTION OF THE DRAWINGS

FIG. 12 is an appearance of the wiper apparatus of the seventh embodiment as viewed from the center of swing of a wiper;

DESCRIPTION OF THE PREFERRED EMBODIMENTS

Figure 1:
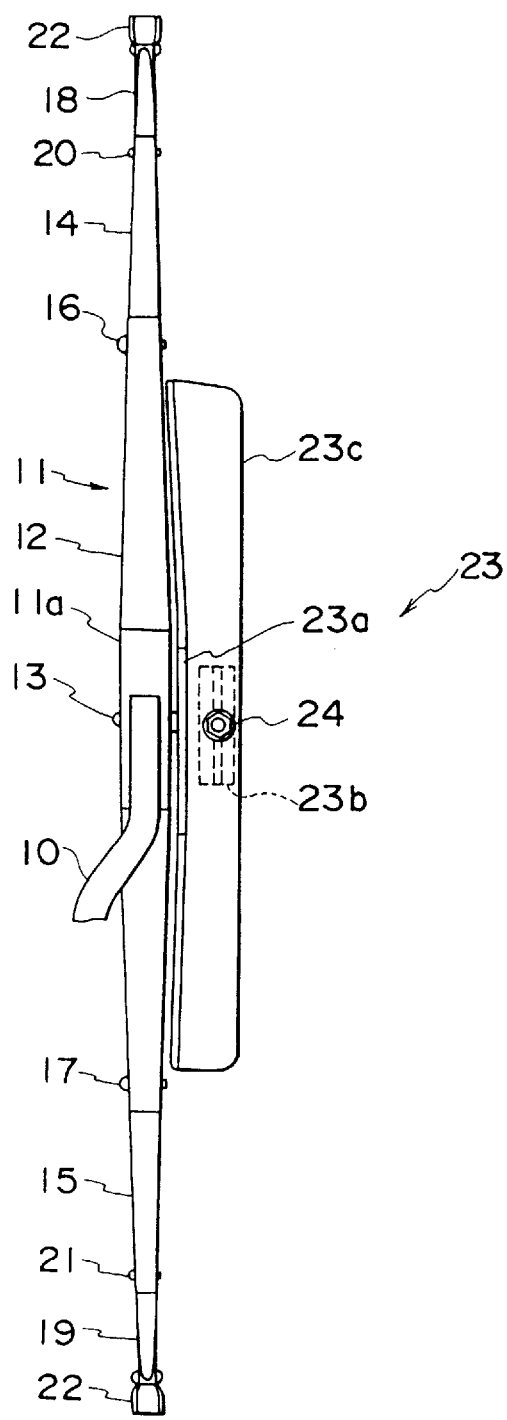
FIG. 1 is a plan view of a wiper apparatus of a first embodiment of the present invention as viewed from above windshield glass.
Figure 2:
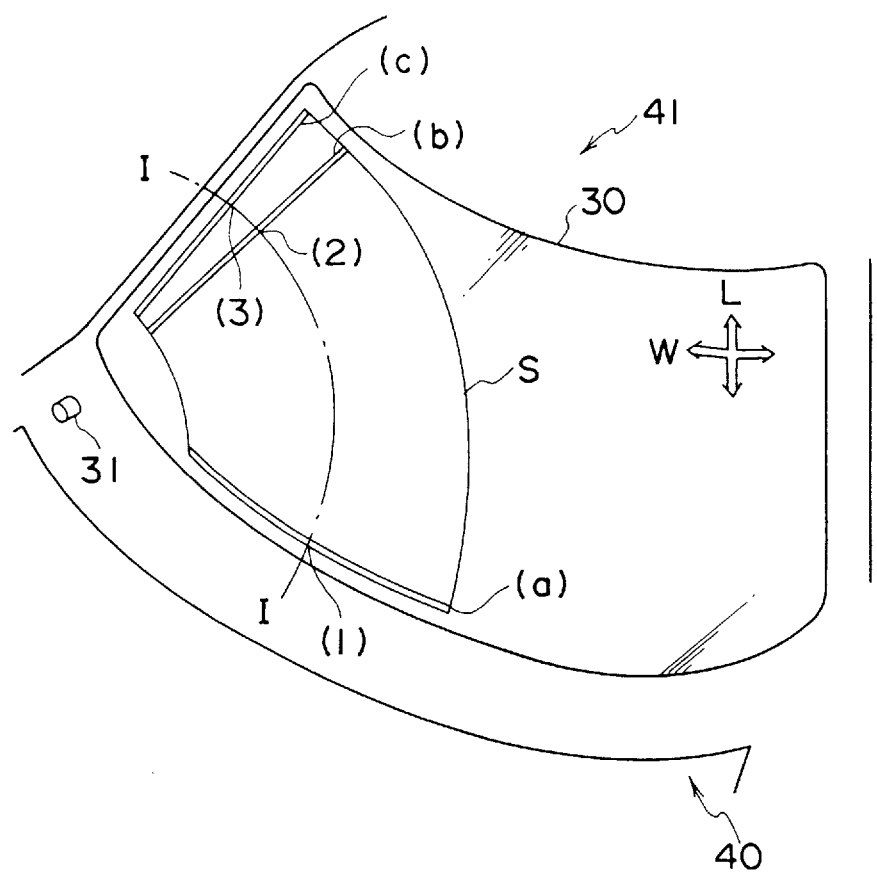
FIG. 2 is a schematic view of the wiping area of the wiper apparatus of the first embodiment.
Figure 3:
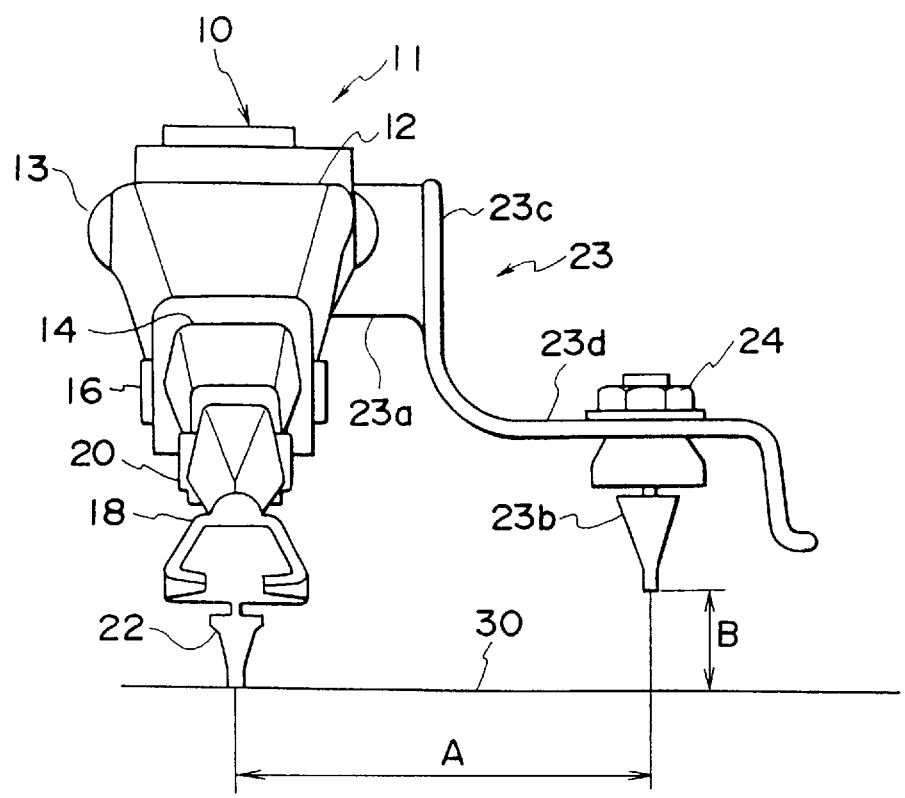
FIG. 3 is an appearance of the wiper apparatus of the first embodiment as viewed from the center of swing of a wiper.

A first embodiment of the present invention will now be described with reference to FIGS. 1 to 3. FIG. 1 is a plan view of a wiper blade as viewed from above windshield glass. FIG. 2 is a schematic view showing an area to be wiped. FIG. 3 is an appearance of the wiper blade placed on windshield glass as viewed from the center of swing of the wiper blade. In FIG. 2, arrow W indicates the widthwise direction of windshield glass, and arrow L indicates the longitudinal direction of windshield glass.

As shown in FIGS. 1 and 3, the fixing portion 11a of a wiper blade 11 is fixed to an end of a wiper arm 10, whose center of swing (not shown) is located down the sheet of FIG. 1. In the wiper blade 11, a primary lever 12 is pivotally supported by the fixing portion 11a using a coupling pin 13. The coupling pin 13 is located on the side surface of the primary lever 12 at a longitudinal direction central portion thereof. Secondary levers 14 and 15 are attached to the primary lever 12 using coupling pins 16 and 17, respectively. The coupling pins 16 and 17 are located on the side surfaces of the secondary levers 14 and 15 at longitudinal direction central portions thereof. Yoke levers 18 and 19 supporting a blade rubber 22 are attached to the secondary levers 14 and 15, respectively, using coupling pins 20 and 21, respectively. The coupling pins 20 and 21 are located on the side surfaces of the yoke levers 18 and 19 at longitudinal direction central portions thereof. This structure is similar to that of a conventional wiper apparatus.

An auxiliary blade unit 23 acting as a dispersing device is fixed to the wiper blade 11 via a support member 23a. The auxiliary blade unit 23 is located at the right of the fixing portion 11a in FIG. 1 and attached to the side surface of the fixing portion 11a at the longitudinal direction central portion thereof. In the auxiliary blade unit 23, the auxiliary blade rubber 23b is fixed to a fin 23c using a nut 24.

As shown in FIG. 2, a windshield glass 30 is formed such that its radius of curvature symmetrically reduces in its widthwise direction (indicated by arrow W) from its central portion toward side end portions. Further, the windshield glass 30 is formed such that its radius of curvature reduces in its longitudinal direction (indicated by arrow L) from the side of an engine hood 40 toward the side of a roof 41. The wiper arm 10 (not shown) swings about a center 31 of swing to wipe area S on the windshield glass surface. In the area S, the position where the wiper blade 11 starts operating is taken as (a), a swing reversing position (where the swing of the wiper arm 10 reverses) is taken as (c), and a position located slightly apart from position (c) on the side of position (a) is taken as (b). Numerals (1), (2), and (3) denote the substantially central positions of the auxiliary blade rubber 23a located at positions (a), (b), and (c), respectively.

As shown in FIG. 3, in the auxiliary blade unit 23, the fin 23c is bent substantially in an L-shape to form a flat portion 23d, and its end portion is bent substantially in a J-shape. The upright portion of the L-shape portion is fixed to the supporting portion 23a. The auxiliary blade rubber 23b is fixed to the side of the flat portion 23d facing the windshield glass 30 using the nut 24 such that the longitudinal direction of the auxiliary blade rubber 23b is substantially parallel with the longitudinal direction of the blade rubber 22.

In order that the auxiliary blade rubber 23b press contacts the windshield glass surface at the wiper's swing reversing position (position (c) in FIG. 2) located at one side end portion of the windshield glass, the auxiliary blade rubber 23b is located distance A away from the blade rubber 22 in the widthwise direction of the blade rubber 22, and also the auxiliary blade rubber 23b is located distance B away from the contact position between the blade rubber 22 and the windshield glass 30 in the direction substantially perpendicular to the windshield glass surface.

These offsets A and B are provided such that the inclination of a plane including the contact position between the blade rubber 22 and the windshield glass and the contact position between the auxiliary blade rubber 23b and the windshield glass is substantially identical to that of the tangential plane of the windshield glass 30 at the position (c) in FIG. 2.

The action of the first embodiment will now be described with reference to FIG. 4 showing schematically the wiper blade 11 of FIG. 3 and using the state of the wiper blades 11 located at positions shown in FIG. 2 and the components parts shown in FIGS. 1 and 3.

Figure 4A:
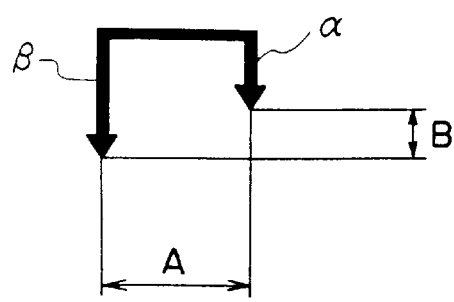
FIG. 4A is a schematic diagram of a wiper blade of the wiper apparatus according to the first embodiment.
Figure 4B:
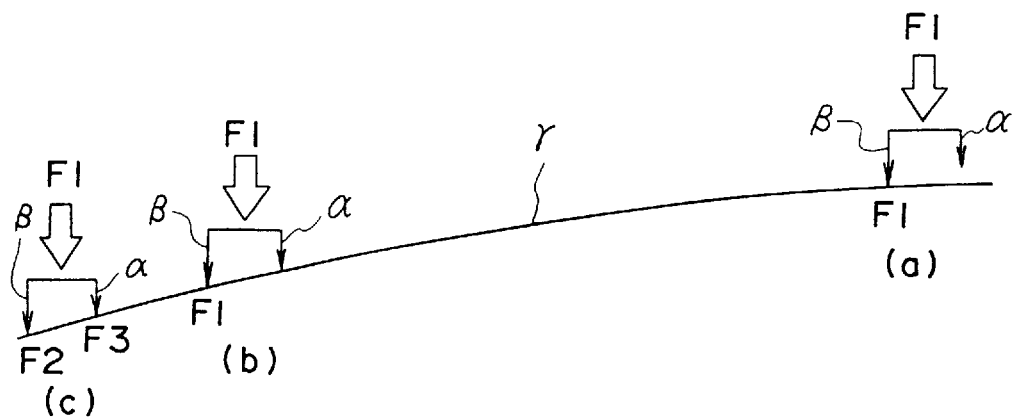
FIG. 4B is a schematic cross-section taken along line I—I of FIG. 2.

FIG. 4A is a schematic diagram of the wiper blade 11 of FIG. 3. FIG. 4B is a schematic diagram showing the state of the wiper blade 11 at positions (a), (b), and (c) as cross-sectioned along line I—I passing through points (1)–(3) of FIG. 2.

As shown in FIG. 4A, arrow a indicates the auxiliary blade rubber 23b, and arrow B indicates the blade rubber 22.

It is assumed that due to application of a pressing force, a force F1 represented by a framed arrow acts on the wiper blade 11, so that pressing forces act on glass surface g of the windshield glass 30 through arrows a and B, as shown in FIG. 4B.

At positions (a) and (b), arrow a is not in contact with surface g, and force F1 acting on the wiper blade 11 acts on surface g only through arrow B. As described above, the surface g of the windshield glass 30 changes in its curvature along the wiping direction, and offsets A and B are provided such that the inclination formed by offsets A and B is substantially identical to that of the tangential plane of the windshield glass 30. Accordingly, at position (c), arrow a press contacts the windshield glass surface g. As a result, force F1 acting on the wiper blade 11 is supported by both arrows a and B, whereby force F1 is dispersed into forces F2 and F3.

That is, the auxiliary blade unit 23 press contacts the windshield glass 30 at the wiper's swing reversing position (position (c) in FIG. 2) located at the side end portion of the windshield glass. This causes a force acting on the wiper blade 11 to be dispersed due to the emergence of another point of application of force to the windshield glass 30. Thus, the press contact force of the wiper blade rubber 22 against the windshield glass surface decreases, thereby decreasing noise generated when swing of the wiper is reversed.

Figure 5:
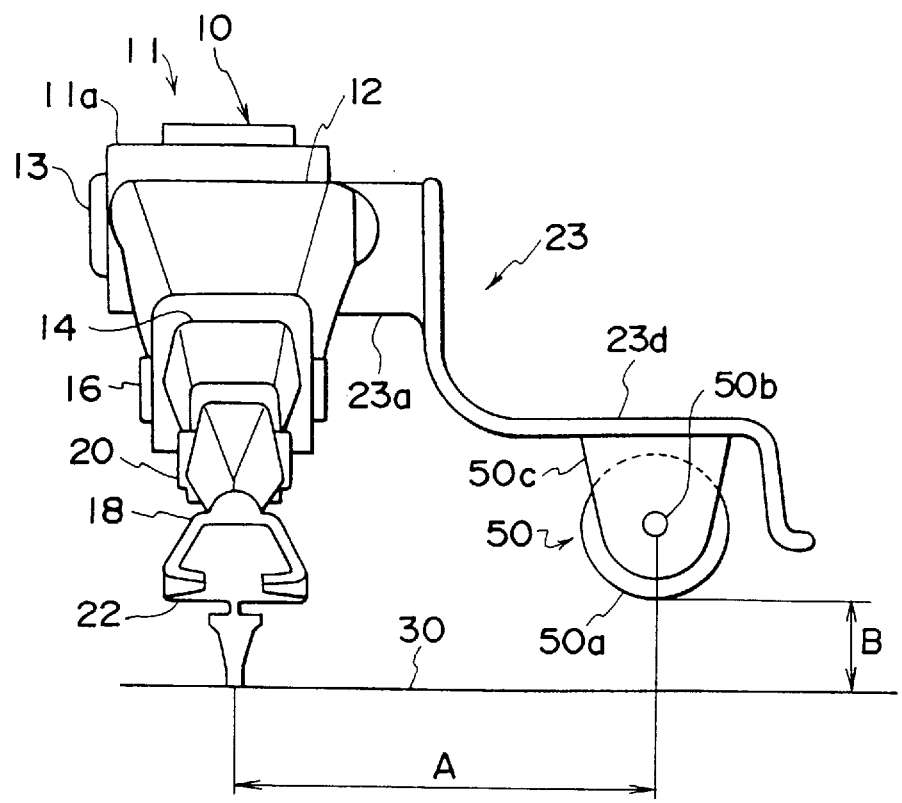
FIG. 5 is an appearance of a wiper apparatus of a second embodiment of the present invention as viewed from the center of swing of a wiper.

A second embodiment of the present invention is similar to the first embodiment except that a roller portion 50 is used in place of the auxiliary blade rubber 23b. The structure of the second embodiment will now be described with reference to FIG. 5. The description of similar features to those of the first embodiment is omitted. FIG. 5, like FIG. 3, shows the appearance of the second embodiment as viewed from the center of swing of a wiper.

As shown in FIG. 5, in the roller portion 50, the rotary shaft 50b of the roller 50a is supported substantially in parallel with the longitudinal direction of the blade rubber 22 by a roller support member 50c provided at the flat portion 23d of the auxiliary blade unit 23. The roller 50a is formed of a soft material such as resin or the like so as not to scratch the windshield glass. As in the first embodiment, in the roller portion 50, the center of rotation of the rotary shaft 50b is located distance A away from the blade rubber 22 in accordance with a change in the curvature of the windshield glass in the wiping direction at the wiper's swing reversing position (the position where the swing of the wiper arm reverses), and also the position of contact of the roller 50a with the windshield glass has offset B in its location from the contact position between the blade rubber 22 and the windshield glass.

The action of the second embodiment will now be described. As in the first embodiment, the roller 50a press contacts the windshield glass 30 at the wiper's swing reversing position (position (c) in FIG. 2), and the roller 50a rolls on the windshield glass 30 while the wiper reverses its swing, thereby dispersing a force acting on the wiper blade 11.

As a result, noise generated when the swing of the wiper Is reversed is decreased as in the first embodiment, and also the roller 50a reduces the force of friction with the windshield glass 30, thereby further decreasing the noise.

Figure 6:
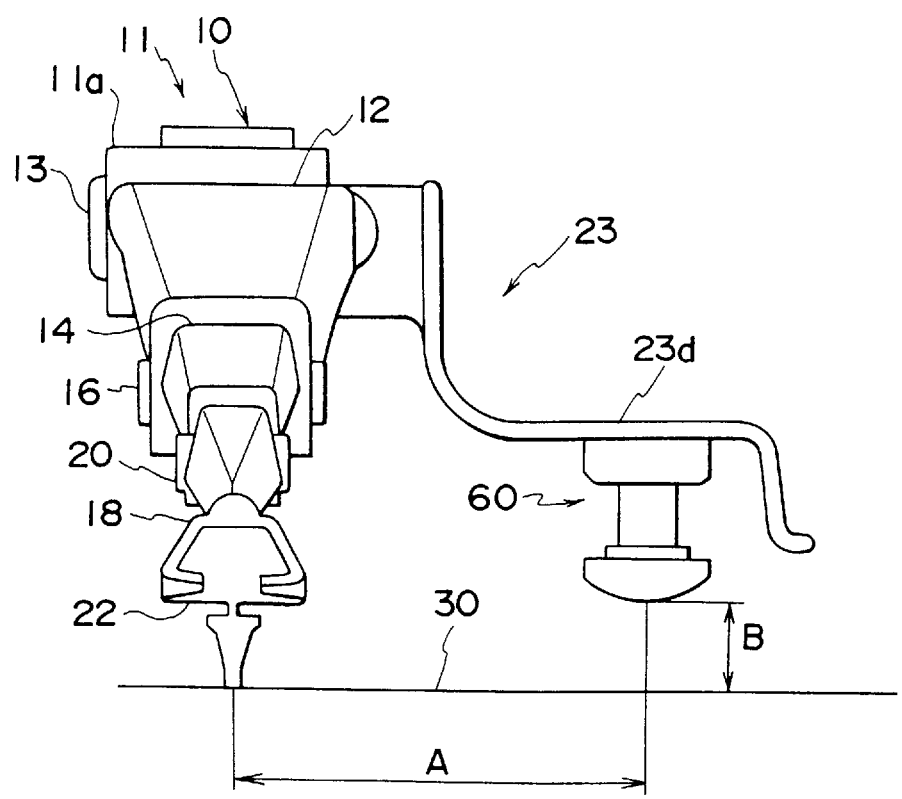
FIG. 6 is an appearance of a wiper apparatus of a third embodiment of the present invention as viewed from the center of swing of a wiper.

A third embodiment of the present invention is similar to the first embodiment except that a protruding portion 60 is used in place of the auxiliary blade rubber 23b. The structure of the third embodiment will now be described with reference to FIG. 6. The description of similar features to those of the first embodiment is omitted. FIG. 6, like FIG. 3, shows the appearance of the third embodiment as viewed from the center of swing of a wiper.

As shown in FIG. 6, the protruding portion 60 is fixed to the flat portion 23d of the auxiliary blade unit 23 substantially in parallel with the longitudinal direction of the blade rubber 22. In order not to scratch the windshield glass, the protruding portion 60 is formed of a soft material such as resin or the like, and its surface of contact with the windshield glass 30 has a gradually protruding shape. As in the first embodiment, in the protruding portion 60, the longitudinal center axis thereof is located distance A away from the blade rubber 22 in accordance with a change in the curvature of the windshield glass in the wiping direction at the wiper's swing reversing position, and also the surface of contact thereof with the windshield glass has offset B in its location from the contact position between the blade rubber 22 and the windshield glass.

The action of the third embodiment will now be described. As in the first embodiment, the protruding portion 60 press contacts the windshield glass 30 at the wiper's swing reversing position (position (c) in FIG. 2), thereby dispersing a force acting on the wiper blade 11.

As a result, noise generated when the swing of the wiper is reversed is decreased as in the first embodiment, and also the rigidity of the auxiliary blade unit 23 improves in the wiper's swinging direction to thereby decrease the deflection of the wiper blade rubber 22 caused by a press contact force, thereby further decreasing the noise.

Figure 7:
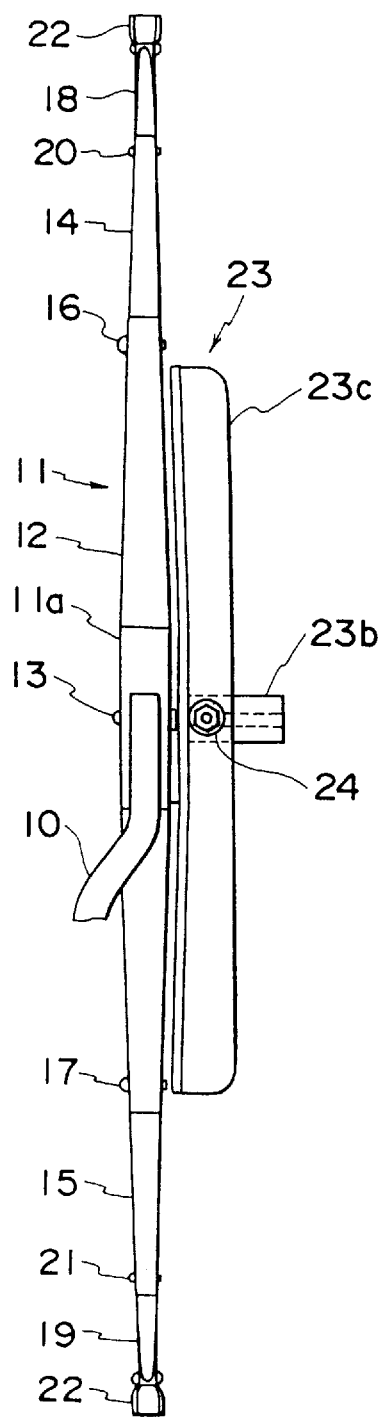
FIG. 7 is a plan view of a wiper apparatus of a fourth embodiment of the present invention as viewed from above windshield glass.

A fourth embodiment of the present invention is similar to the first embodiment except that the longitudinal direction of the auxiliary blade rubber 23 is positioned perpendicularly to that of the blade rubber 22. The structure of the fourth embodiment will now be described with reference to FIG. 7. The description of similar features to those of the first embodiment is omitted. FIG. 7 shows a plan view of the fourth embodiment as viewed from above the windshield glass.

As shown in FIG. 7, the auxiliary blade rubber 23b is fixed to the fin 23c using the nut 24 such that the longitudinal direction of the auxiliary blade rubber 23 is positioned substantially at right angle with that of the blade rubber 22.

The action of the fourth embodiment will now be described. As in the first embodiment, the protruding portion 60 press contacts the windshield glass 30 at the wiper's swing reversing position (position (c) in FIG. 2), thereby dispersing a force acting on the wiper blade 11.

As a result, noise generated when the swing of the wiper is reversed is decreased. Further, since the longitudinal direction of the auxiliary blade rubber 23b corresponds to the wiper's swinging direction, the rigidity of the auxiliary blade unit 23 improves in the wiper's swinging direction. This decreases the deflection of the wiper blade rubber 22 caused by a press contact force, thereby further decreasing the noise.

Figure 8:
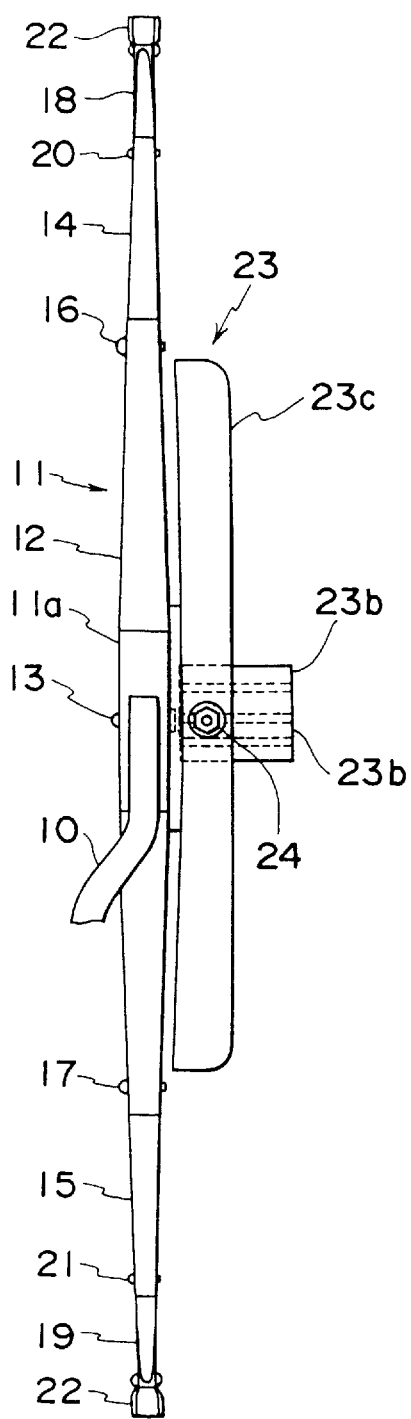
FIG. 8 is a plan view of a wiper apparatus of a fifth embodiment of the present invention as viewed from above windshield glass.

A fifth embodiment of the present invention is similar to the fourth embodiment except that more than one auxiliary blade rubbers 23b is used. The structure of the fifth embodiment will now be described with reference to FIG. 8. The description of similar features to those of the first embodiment is omitted. FIG. 8 shows a plan view of the fifth embodiment as viewed from above the windshield glass.

As shown in FIG. 8, two auxiliary blade rubbers 23b are arranged in parallel with each other and fixed to the fin 23c using the nut 24 such that the longitudinal direction of the auxiliary blade rubbers 23 is positioned substantially at right angle with that of the blade rubber 22.

The action of the fifth embodiment will now be described. As in the fourth embodiment, the auxiliary blade rubbers 23b press contacts the windshield glass 30 at the wiper's swing reversing position (position (c) in FIG. 2), thereby dispersing a force acting on the wiper blade 11. Further, more than one auxiliary blade rubber 23b is used for dispersing a force acting on the wiper blade 11, thereby further decreasing a press contact force of the wiper blade rubber 22 against the windshield glass 30.

This decreases noise generated when the swing of the wiper is reversed. In addition, the rigidity of the auxiliary blade unit 23 improves in the wiper's swinging direction, thereby further decreasing noise generated when the swing of the wiper is reversed.

A sixth embodiment of the present invention is similar to the first embodiment except that the auxiliary blade rubber 23b is substantially in a U-shape. The structure of the sixth embodiment will now be described with reference to FIG. 9.

Figure 9:
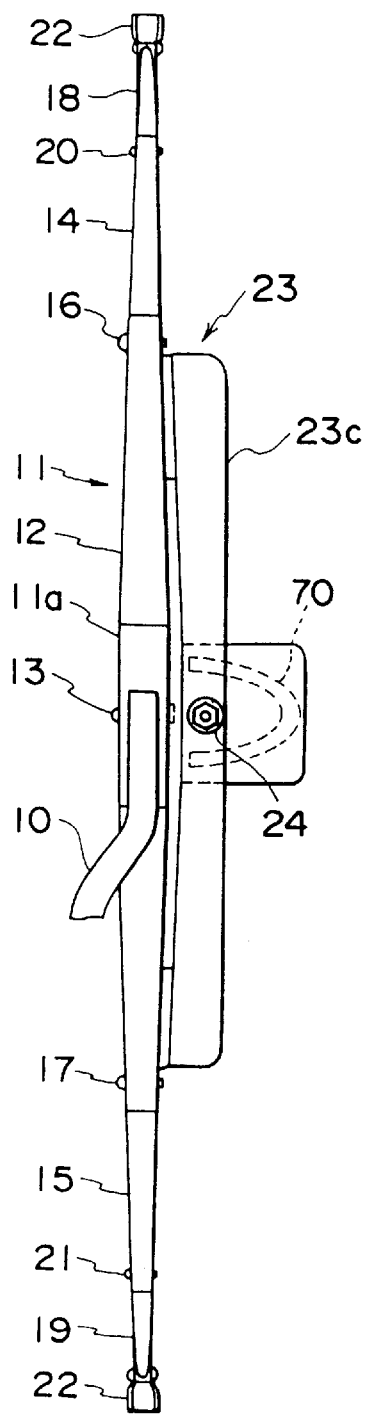
FIG. 9 is a plan view of a wiper apparatus of a sixth embodiment of the present invention as viewed from above windshield glass.

The description of similar features to those of the first embodiment is omitted. FIG. 9 shows a plan view of the sixth embodiment as viewed from above the windshield glass.

As shown in FIG. 9, an auxiliary blade rubber 70 is formed substantially in a U-shape and provided such that the bent tip of the U-shape is more away from the wiper arm 11 than both end portions thereof.

The action of the sixth embodiment will now be described. As in the first embodiment, the auxiliary blade rubber 70 press contacts the windshield glass 30 at the wiper's swing reversing position (position (c) in FIG. 2), thereby dispersing a force acting on the wiper blade 11.

As a result, noise generated when the swing of the wiper is reversed is decreased. Further, since the rigidity of the auxiliary blade unit 23 improves in the wiper's swinging direction, the deflection of the wiper blade rubber 22 caused by a press contact force decreases. In addition, since the auxiliary blade rubber 70 is formed substantially in a U-shape, the wiper blade rubber 22 is less likely to leave traces of wiping, thereby improving the wiping performance.

As has been described above, according to the first through sixth embodiments, the contact portion of the auxiliary blade unit 23 press contacts the windshield glass 30 at the wiper's swing reversing position (position (c) in FIG. 2) located at the side end portion of the windshield glass 30, thereby dispersing a force acting on the wiper blade 11 and thus decreasing the press contact force of the wiper blade rubber 22 against the windshield glass 30. As long as these features are effected, the structure, material, quantity, position and the like regarding the dispersing device are not to be limited to those of the embodiments.

Figure 10:
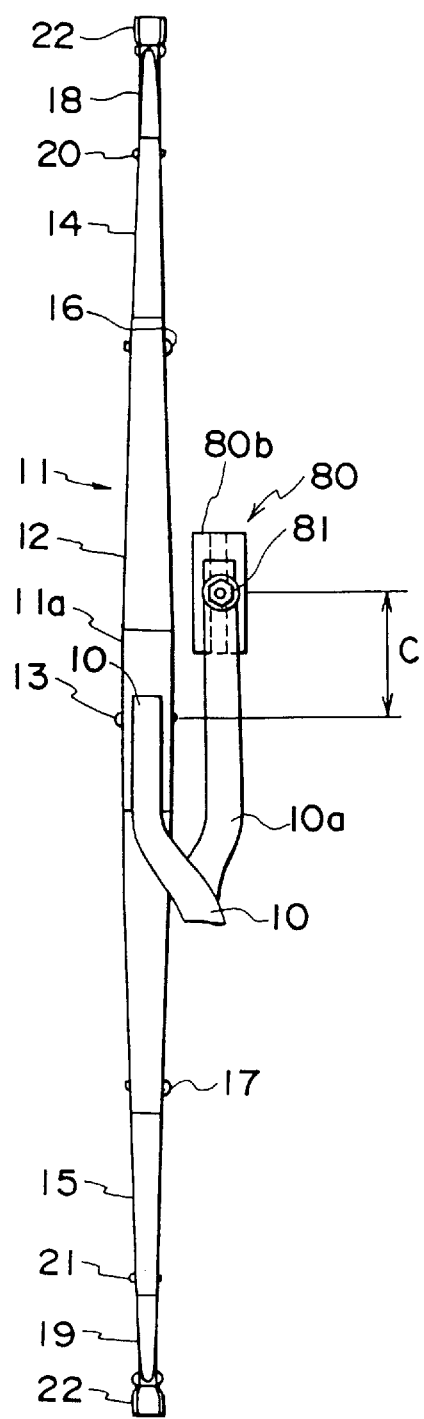
FIG. 10 is a plan view of a wiper apparatus of a seventh embodiment of the present invention as viewed from above windshield glass.
Figure 11:
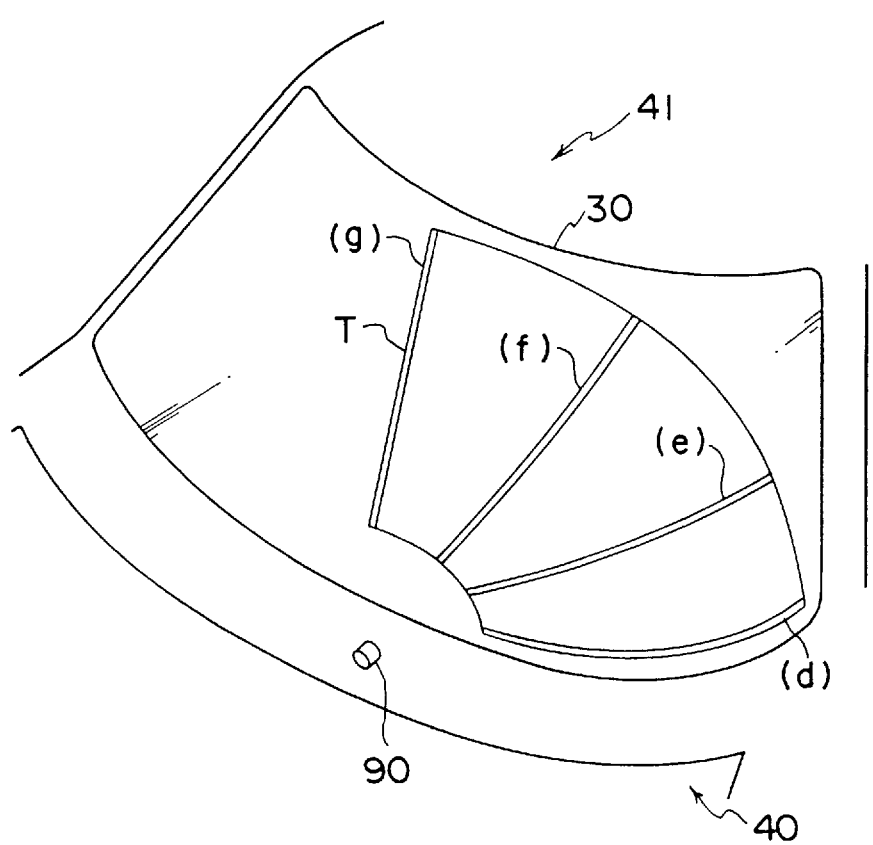
FIG. 11 is a schematic view of the wiping area of the wiper apparatus of the seventh embodiment.
Figure 13A:
FIG. 13A is a schematic diagram showing the wiper apparatus of the seventh embodiment located at wiping position (d) of FIG. 11.
Figure 13B:
FIG. 13B is a schematic diagram showing the wiper apparatus of the seventh embodiment located at wiping position (e) of FIG. 11.
Figure 13C:
FIG. 13C is a schematic diagram showing the wiper apparatus of the seventh embodiment located at wiping position (f) of FIG. 11.
Figure 13D:
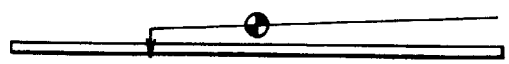
FIG. 13D is a schematic diagram showing the wiper apparatus of the seventh embodiment located at wiping position (g) of FIG. 11.
Figure 14A:
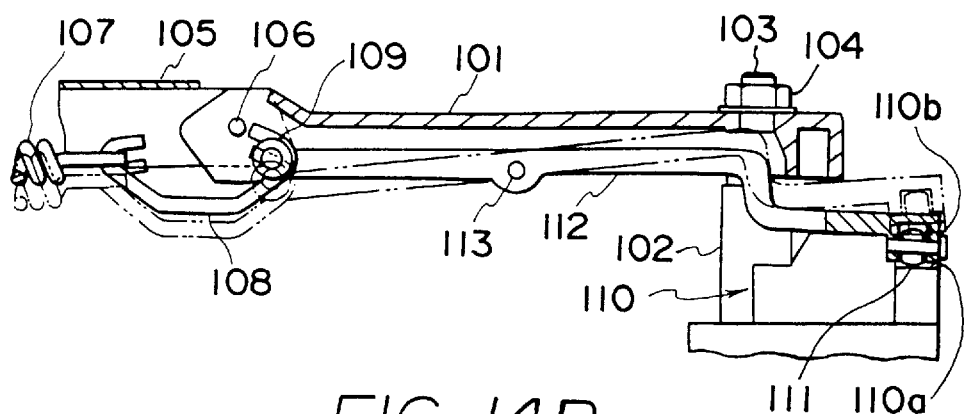
FIG. 14A is a partial cross-section showing part of a conventional wiper apparatus.
Figure 14B:
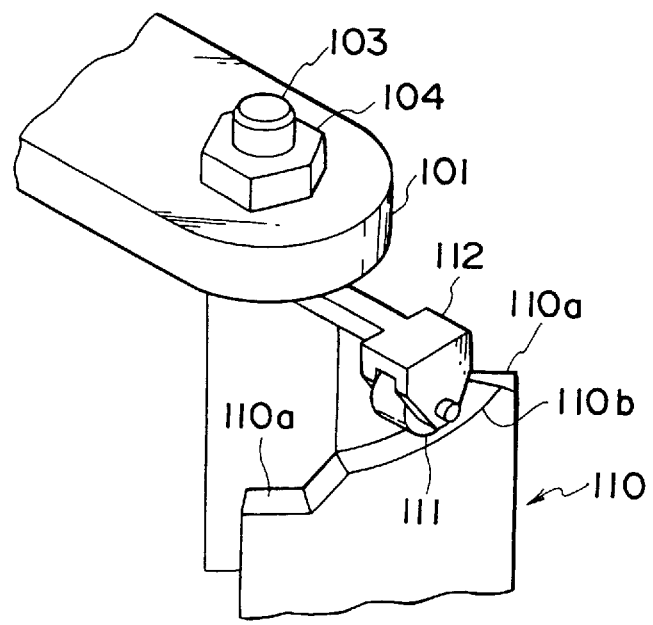
FIG. 14B is a perspective view showing apart of the conventional wiper apparatus.

A seventh embodiment of the present invention is about a right-hand wiper as the windshield glass surface is viewed from ahead of a vehicle. The structure of the embodiment will now be described with reference to FIGS. 10 to 12. FIG. 10 shows a plan view of the embodiment as viewed from above the windshield glass. FIG. 11 shows a schematic view of the wiping area covered by the embodiment. FIG. 12 shows an appearance of a wiper mounted as viewed from the center of its swing. The description of similar features to those of the first embodiment is omitted.

As shown in FIG. 10, an auxiliary arm 10a branches from the end portion of the wiper arm 10 toward the right side of the fixing portion 11a in the wiping direction of the wiper arm 11. An auxiliary blade 30 to which an auxiliary blade rubber 80b is fixed is fixed to the auxiliary arm 10a using a nut 81 such that the auxiliary blade 30 is substantially in parallel with the longitudinal direction of the blade rubber 22. Offset C is provided between the coupling pin 13 of the wiper blade and the center of the nut 81 in accordance with the curvature of the windshield glass 30 in its longitudinal direction.

As shown in FIG. 11, the wiper arm 10 (not shown) swings about a center 90 of swing so as to wipe area T on the windshield glass surface. In area T, the position where the wiper arm 10 starts operating is taken as (d), a swing reversing position (where the swing of the wiper arm 10 reverses) is taken as (g), a position located slightly apart from position (d) on the side of position (g) is taken as (e), and a position located slightly apart from position (e) on the side of position (g) is taken as (f).

As shown in FIG. 12, the auxiliary blade rubber 80b press contacts the windshield glass 30 at position (g) of FIG. 11, which is a wiper's swing reversing position located at the widthwise direction central portion of the windshield glass. Accordingly, offset D is provided between the auxiliary blade rubber 80b and the glade rubber 22, and offset E is provided between the auxiliary blade rubber 80b and the contact surface of the blade rubber 22 with the windshield glass in accordance with the curvature of the windshield glass 30 in its longitudinal direction.

Offsets C, D, and E are provided, as in the first embodiment, such that the inclination of a plane including the contact position between the blade rubber 22 and the windshield glass and the contact position between the auxiliary blade rubber 23b and the windshield glass is substantially identical to that of the tangential plane of the windshield glass 30 at position (g) in FIG. 11.

Offset C will now be described. In the case of the left-hand wiper of FIG. 2 as the windshield glass is viewed from ahead of a vehicle, the blade rubber 22 is substantially in parallel with the side end portion of the windshield glass 30 at the wiper's swing reversing position (c). Hence, an offset is determined without considering a change in the curvature of the windshield glass 30 in the widthwise direction of a vehicle. However, in the case of the right-hand wiper of FIG. 11 as the windshield glass is viewed from ahead of a vehicle, the blade rubber 22 obliquely extends in the vertical direction at the wiper's swing reversing position (g) at the central portion of the windshield glass 30 and thus is influenced by a change in the curvature of the windshield glass 30 in the widthwise direction of a vehicle. Accordingly, it is necessary to provide offset C in the longitudinal direction of the blade rubber 22.

The action of the seventh embodiment will now be described with reference to FIG. 13 showing schematically the state of the wiper blade at the positions shown in FIG. 11 and using components parts shown in FIGS. 10 and 12.

FIG. 13 schematically shows the state of the wiper arm 11 at positions (d), (e), (f), and (g) of FIG. 11.

As shown in FIG. 13, the blade rubber 22 is in a most bent state at position (d) and in a most straightened state at position (g) where the swing of a wiper reverses. Since the auxiliary blade rubber 80b is provided with offset C between the coupling pin 13 of the wiper blade and the center of the nut 81, offset D to the blade rubber 22, and offset E to the surface of contact between the blade rubber 22 and the windshield glass, the auxiliary blade rubber 80b press contacts the windshield glass 30 at position (g).

That is, as in the first embodiment, a force acting on the wiper blade 11 is dispersed.

This decreases the press contact force of the blade rubber 22, resulting in decreased noise generated when the swing of the wiper is reversed.

As has been described above, according to the seventh embodiment, a force acting on the wiper blade 11 is dispersed at the wiper's swing reversing position (g). As long as this feature is effected, the structure, material, mounting position and the like regarding the dispersing device are not to be limited to those of the embodiment.

According to the first through seventh embodiments, a force acting on the wiper blade 11 is dispersed onto the windshield glass 30 at the position where the swing of the wiper blade 11 reverses, thereby decreasing the press contact force of the blade rubber 22 against the windshield glass 30. Accordingly, a change in force is directly transmitted to the blade rubber 22. That is, a loss of force is less, a change of force is efficiently transmitted to a point of application, and noise generated when the swing of the wiper is reversed is decreased sufficiently.

Thus, noise generated when the swing of the wiper is reversed is decreased by providing the auxiliary blade unit 23 without using a complex structure including links, cams and the like, whereby poorer workmanship of assembly is avoided.

What is claimed is:

1. In a vehicle body including a windshield glass to be cleaned, a wiper apparatus comprising:

an elongated blade rubber for wiping the windshield glass;

a wiper blade which is formed in an elongated shape and on which said blade rubber is mounted;

a wiper arm having one longitudinal end portion on which said wiper blade is mounted and another longitudinal end portion which is pivotally supported on the vehicle body, so that said wiper arm swings between two reversing positions, said wiper arm being provided such that a pressing contact force is applied to said wiper arm so as to cause said blade rubber to contact the windshield glass with a predetermined press contact force; and a dispersing device, fixed to said wiper blade by a supporting member, for dispersing toward the windshield glass the press contact force applied to said blade rubber due to the pressing force of said wiper arm, by said dispersing device and said blade rubber together press contacting the windshield glass substantially only at a vicinity of at least one of said two reversing positions at which swinging of said wiper arm reverses, so as to reduce the press contact force of said blade rubber against the windshield glass substantially only at said one of said reversing positions, wherein said dispersing device defines a contact point for engaging the windshield, said contact point of said dispersing device being spaced in a widthwise direction from and offset perpendicularly from a contact edge of said blade rubber in accordance with a curvature of the windshield glass at said one of said reversing positions of the wiper arm so that a plane which includes said contact point and said contact edge substantially coincides with a surface of the windshield glass at said reversing positions, so that said dispersing device and said blade rubber press contact the windshield glass at said one of said reversing positions, and wherein the windshield glass curves toward the rear of a vehicle at both side portions thereof with respect to a widthwise direction central portion thereof and curves toward a roof of the vehicle at an upper portion of the widthwise direction central portion thereof, said dispersing device is provided at each reversing position at a position which is separated in accordance with the curvature of the windshield glass by a predetermined distance in a longitudinal direction of said wiper blade from a longitudinal direction central portion of said wiper blade, so that said dispersing device press contacts the windshield glass together with said blade rubber at the reversing positions of said wiper arm.

2. A wiper apparatus according to claim 1, wherein said dispersing device comprises an auxiliary blade rubber which contacts the windshield glass at the reversing positions, and said auxiliary blade rubber is formed in an elongated shape and is provided such that a longitudinal direction of said auxiliary blade rubber is substantially parallel to a longitudinal direction of said wiper blade.

3. In a vehicle body including a windshield glass to be cleaned, a wiper apparatus comprising:

an elongated blade rubber for wiping the windshield glass;

a wiper blade which is formed in an elongated shape and on which said blade rubber is mounted;

a wiper arm having one longitudinal end portion on which said wiper blade is mounted and another longitudinal end portion which is pivotally supported on the vehicle body, so that said wiper arm swings between two reversing positions, said wiper arm being provided such that a pressing contact force is applied to said wiper arm so as to cause said blade rubber to contact the windshield glass with a predetermined press contact force; and a dispersing device, fixed to said wiper blade by a supporting member, for dispersing toward the windshield glass the press contact force applied to said blade rubber due to the pressing force of said wiper arm, by said dispersing device and said blade rubber together press contacting the windshield glass substantially only at a vicinity of at least one of said two reversing positions at which swinging of said wiper arm reverses, so as to reduce the press contact force of said blade rubber against the windshield glass substantially only at said one of said reversing positions, wherein said dispersing device defines a contact point for engaging the windshield, said contact point of said dispersing device being spaced in a widthwise direction from and offset perpendicularly from a contact edge of said blade rubber in accordance with a curvature of the windshield glass at said one of said reversing positions of the wiper arm so that a plane which includes said contact point and said contact edge substantially coincides with a surface of the windshield glass at said reversing positions, so that said dispersing device and said blade rubber press contact the windshield glass at said one of said reversing positions, wherein said dispersing device is fixed to transverse direction sides of said wiper blade, and wherein said dispersing device comprises an auxiliary blade rubber which contacts the windshield glass at the reversing portions.

4. A wiper apparatus according to claim 3, wherein said auxiliary blade rubber is formed in an elongated shape and is provided such that a longitudinal direction of said auxiliary blade rubber is substantially parallel to a longitudinal direction of said wiper blade.

5. A wiper apparatus according to claim 3, wherein said auxiliary blade rubber is provided such that a longitudinal direction of said auxiliary blade rubber is substantially perpendicular to a longitudinal direction of said wiper blade.

6. A wiper apparatus according to claim 3, wherein said auxiliary blade rubber is formed in a substantial U-shape so as to have a bent portion and two end portions, the bent portion of said auxiliary blade rubber being further away from said wiper arm than both end portions of said auxiliary blade rubber.

7. A wiper apparatus according to claim 3, wherein said dispersing device comprises a roller, said roller contacting the windshield glass at the reversing positions.

8. A wiper apparatus according to claim 3, wherein said dispersing device comprises a protruding portion which contacts the windshield glass at the reversing positions.

* * * * *